Figure 2:
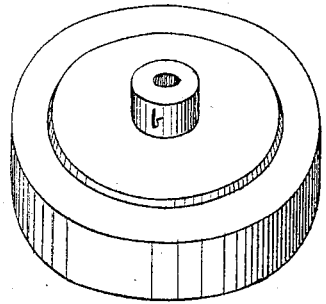

S. A. BRACKETT,

Improvement in Heels.

No. 132,747.                               Patented Nov. 5, 1872.

Witnesses.
J. Le. Keith
William Standish

Inventor.
Saml. A. Brackett

UNITED STATES PATENT OFFICE.

SAMUEL A. BRACKETT, OF BOSTON, MASSACHUSETTS.

IMPROVEMENT IN HEELS.

Specification forming part of Letters Patent No. 132,747, dated November 5, 1872.

*To all whom it may concern:*

Be it known that I, SAMUEL A. BRACKETT, of Boston, in the county of Suffolk and State of Massachusetts, have invented a new and useful Mode of Constructing a Tenon, Stopper, or other similar part, made of a suitable expansible material, and of expanding it within an inwardly-enlarging aperture in which it is desired to insert and secure it, of which the following is a specification:

General Description.

My invention is illustrated and will be understood by a description of an improvement in rotary heels for boots and shoes, to which I have applied it. This improvement relates more particularly to that class of rotary heels described in sundry patents granted to A. O. Crane, in which the tread part at least is made of a compound of India rubber or other similar material, and molded into form, and the heel-seat is prepared and shaped previously to being attached to the sole, and is as follows:

Centrally upon the inner surface of the tread part of the heel an upright cylindrical tubular tenon, about one-half of an inch in diameter, is molded of a compound similar to that of which the tread part is composed, but preferably somewhat more elastic. The bore of the tenon is continuous with a central cylindrical hole, about one-fourth of an inch in diameter, molded through the tread part of the heel; but from about the point where it enters the tenon, the bore gradually diminishes in size upward to the end of the tenon, where its diameter is about one-eighth of an inch. Centrally through the heel-seat, when it is prepared, a circular aperture is molded or bored with a diameter at the outer surface of the heel-seat, against which the tread part is to abut, the same as the diameter of the tenon described, but gradually enlarging within the heel-seat so as to constitute a socket therein of a form corresponding to the form of the frustum of a cone, the sole of the shoe, when the heel is attached thereto, making the bottom of the socket. A smooth cylindrical pin of wood or other suitable inflexible material, and of the same diameter throughout its length as that of the largest part of the bore in the tenon, and preferably about an eighth of an inch longer than the tenon, is prepared, and the parts are ready to be put together. The heel-seat being attached to the shoe, the tenon on the tread part is inserted in the socket on the heel-seat, and the cylindrical pin is forced through the hole in the tread part into the bore of the tenon to its end. By reason of the difference in the diameters of the pin and the bore the pin expands the tenon within the socket from the point where the diameter of the bore begins to diminish, and this expansion makes a secure circular dovetail connection of the one part of the heel with the other. The pin also renders the tenon more rigid as an axis when the tread part is revolved, to equalize the wear of the heel in use. Practically, the proper distance for the pin to be forced in will be indicated by its striking the sole of the shoe, which, ordinarily, the end of the tenon will reach; but this distance may be limited by contracting the bore of the tenon or making it impervious, when it is molded, at its extreme end. The pin is held fast in its place by the elasticity of the tenon. I consider it desirable that it should be long enough after it is forced home to extend about one-eighth of an inch below the base of the tenon into the hole in the tread part of the heel. This gives greater stiffness to the tenon, and when a worn-out tread part is to be replaced by a new one and the old one has been removed by cutting round the base of the tenon, the end of the pin will be exposed so that it can be readily withdrawn. The height of the tenon had best be about one-sixteenth of an inch less than the depth of the socket in the heel-seat, since the pin, as it is forced in, not only expands the tenon laterally, but extends it slightly in a longitudinal direction. The dimensions of the tenon and other parts may be varied according to the size of the heel; and the dimensions and relative dimensions given in this specification are approximate only, and may be matter of judgment in construction. A revolving heel can be constructed substantially like the one described, but differing in having the bore of the tenon cylindrical throughout, or slightly conical, with the larger diameter of the bore at the end of the tenon, and in either case having the pin made more or less conical according to the amount of expansion to be effected.

With such a construction of the parts as is last above described they are put together as follows: The smaller end of the pin is entered in the end of the tenon. The larger end of the pin is then entered in the socket in the heel-seat, bearing against the sole of the shoe, and, sufficient pressure being applied to either part of the heel in the direction of the other, the pin is gradually forced into the tenon and the tenon into the socket, simultaneously, and the tenon is expanded within the socket, so that it cannot be readily withdrawn; but I consider the other mode of constructing and connecting the parts preferable, and the only one that properly illustrates my principal invention.

My invention is likewise applicable to tenons, stoppers, and other similar parts made in other forms than cylindrical. The only material variation from the mode of constructing the parts when the form is cylindrical, necessary to be observed when the form is other than cylindrical, being always indicated by the exterior form of the principal parts—that is, the part which is to be expanded and the aperture for which it is designed, with which the subordinate parts—that is, the pin and the hole through which it is to be forced—must correspond.

*Description of the Accompanying Drawing.*

Figure 1:
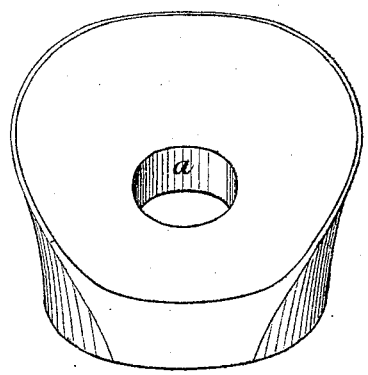
Figure 5:
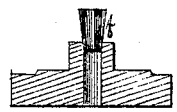
Figure 3:
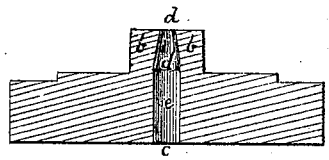
Figure 4:
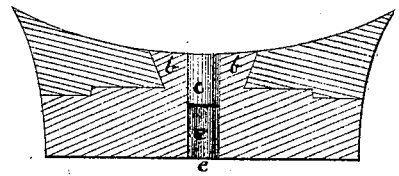

Figure 1 shows the heel-seat with the circular aperture or conical socket $a$, within which the tenon is to be expanded, seen from the inner face of the seat. Fig. 2 shows the tread part of the heel, with the tubular tenon $b$ on its inner surface, before its expansion. Fig. 3 is a central vertical section of the tread part of the heel, showing the gradually-diminishing bore of the tenon $d$ continuous with the central cylindrical hole in the tread part $e$. Fig. 4 is a central vertical section of the two parts of the heel united, with the tenon $b$ expanded in its socket and the pin $c$ in place. Fig. 5 is a central vertical section of a tread part of a heel having the bore of the tenon cylindrical throughout, and designed to be expanded by means of a conical pin, $f$, forced into the tenon from its end. The figure shows the pin $f$ entered in the end of the tenon.

*Claims.*

I claim as my invention—

1. In a tenon, stopper, or other similar part made of a suitable expansible material and designed to be inserted and made fast in an inwardly-enlarging aperture, a bore gradually diminishing in size toward the end and throughout the section to be inserted, for the purpose of expanding the inserted section within the aperture, substantially as hereinbefore set forth.

2. In a tenon, stopper, or other similar part made of a suitable expansible material, the combination of a gradually-diminishing bore, $d$, with an expanding-pin, $c$, as shown in the drawing, and substantially as and for the purposes hereinbefore set forth.

3. In a rotary heel, the combination of the conical socket $a$, the expansible tubular tenon $b$, and the pin $c$, substantially as and for the purposes hereinbefore set forth.

4. In a rotary heel, the pin $c$, when used for the purpose of giving greater rigidity to the tenon, by which the heel-seat and tread part of such a heel are connected, substantially as hereinbefore set forth.

SAMUEL A. BRACKETT.

Witnesses:
    J. M. KEITH,
    WILLIAM STANDISH.